US006635198B1

(12) United States Patent
Vatland et al.

(10) Patent No.: US 6,635,198 B1
(45) Date of Patent: Oct. 21, 2003

(54) METHOD FOR PRODUCING ELONGATED CARBON BODIES

(75) Inventors: Arnfinn Vatland, Kristiansand (NO); Olaf Trygve Vegge, Kristiansand (NO)

(73) Assignee: Elkem ASA (NO)

( * ) Notice: Subject to any disclaimer, the term of this patent is extended or adjusted under 35 U.S.C. 154(b) by 0 days.

(21) Appl. No.: 09/674,107

(22) PCT Filed: Apr. 15, 1999

(86) PCT No.: PCT/NO99/00121

§ 371 (c)(1), (2), (4) Date: Jan. 23, 2001

(87) PCT Pub. No.: WO99/56503

PCT Pub. Date: Nov. 4, 1999

(30) Foreign Application Priority Data

Apr. 24, 1998 (NO) ........................................... 19981842

(51) Int. Cl.[7] ............................ C01B 31/02; H05B 7/09
(52) U.S. Cl. ....................................... 264/29.1; 264/105
(58) Field of Search ................................ 264/29.1, 105

(56) References Cited

U.S. PATENT DOCUMENTS 3,876,744 A * 4/1975 Onder ........................ 264/105
4,122,294 A 10/1978 Frolov
4,612,151 A 9/1986 Bruff et al.

FOREIGN PATENT DOCUMENTS

SE 112236 10/1944

* cited by examiner

*Primary Examiner*—Leo B. Tentoni
(74) *Attorney, Agent, or Firm*—Muserlian, Lucas and Mercanti

(57) ABSTRACT

The present invention relates to a method for continuous production of elongated carbon bodies, particularly carbon electrodes which are produced in direct connection with the smelting furnace wherein the electrodes are consumed, where a metallic casing containing unbaked carbonaceous electrode paste comprising a particulate solid carbon material and a carbonaceous binder is continuously or substantially continuously lowered through a baking furnace which is heated to a temperature between 500 and 1200° C., whereby the unbaked electrode paste is baked into a solid carbon body and where the casing is extended by joining new sections of casing on the top of the casing as the casing is lowered through the baking furnace, where the lower part of each section of casing has an outer diameter that is equal to or smaller than the inner diameter of the upper part of each section of casing, said method being characterized in that each new section of casing is mounted upon the section of casing below in such a way that the lower part of the new section of casing is positioned inside the casing of the upper part of the section of casing situated below the new section of casing and where the length of the lower part of each section of casing has such an extension that the new section of casing during baking freely can slide downwards in relation to the section of casing situated below the new section of casing a distance which at least compensates for the shrinkage of the electrode paste contained in the casing during baking of the carbon body in the baking furnace.

7 Claims, 3 Drawing Sheets

METHOD FOR PRODUCING ELONGATED CARBON BODIES

FIELD OF INVENTION

Figure 1:
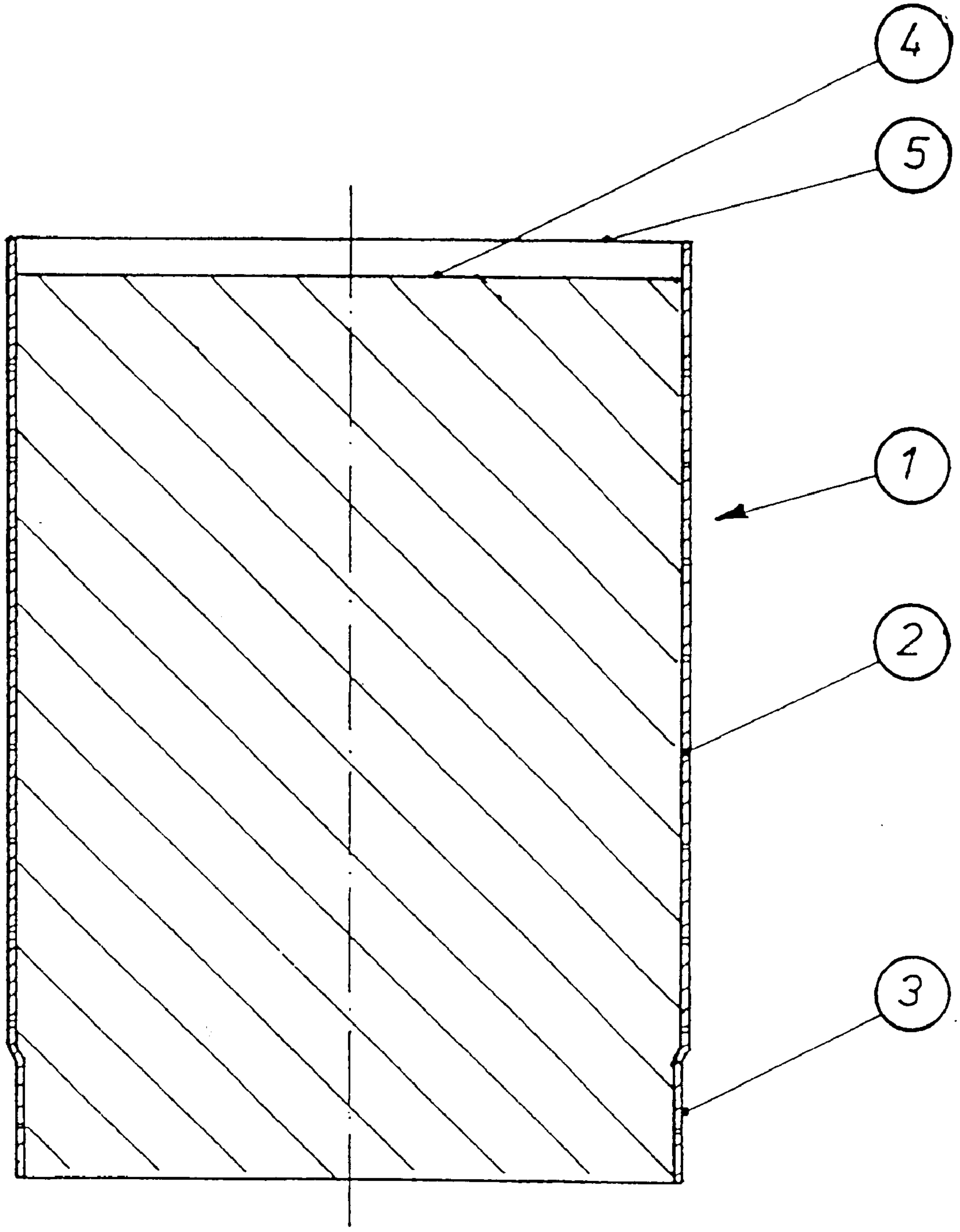

The present invention relates to a method for continuous production of elongated carbon bodies, and more particularly to carbon electrodes which are produced in direct connection to a smelting furnace wherein the electrodes are used, where a metallic casing containing unbaked carbonaceous electrode paste consisting of a particulate carbon material and a carbonaceous binder is being baked into a solid carbon body by lowering the metallic casing containing the carbonaceous electrode paste down through a baking furnace.

BACKGROUND ART

From Norwegian patent No. 154860 it is known a method for continuously production of elongated carbon bodies wherein a perforated metallic casing containing unbaked carbonaceous electrode paste consisting of a particulate solid carbon material and a carbonaceous binder, continuously or substantially continuously is lowered down through a baking furnace which is heated to a temperature between 500 and 1300° C. The unbaked carbonaceous electrode paste is at this temperature baked into a solid carbon body. As the casing is being lowered down through the baking furnace new sections of casing are welded to the top of the metallic casing and further unbaked carbonaceous electrode paste is being filled into the casing.

The above described method can either be used for continuous production of elongated carbon bodies which after being baked in the baking furnace are cut into suitable lengths and which can be utilized as lining blocks for smelting furnaces, bottom blocks for cathodes in electrolytic cells for the production of aluminium and the like; or the method can be used for the production of continuous carbon electrodes in direct connection to a smelting furnace wherein the electrodes are being used. In the last mentioned case the baking furnace is arranged above the smelting furnace in such a way that the produced electrodes extend into the smelting furnace where they are consumed. The produced elongated carbon bodies may have any suitable cross-section. Carbon electrodes which are produced in direct connection with smelting furnaces usually have a circular cross-section.

By the known method new sections of casing are, as mentioned above, welded to the top of the casing. This is a labour intensive operation. Further, when the electrodes are produced in direct connection with a smelting furnace where the electrodes are consumed, the welding operation takes place in a hot and often polluted gas atmosphere. For electrodes where the casing is removed when the electrodes has been baked, the welding of the sections of the casing to each other means that the casing has to be cut horizontally in order to have it removed.

Upon heating the viscosity of the electrode paste is decreased whereby the electrode paste softens and upon further heating to a temperature between 500 and 1300° C., the electrode paste is baked into a solid carbon body. During the heating the electrode paste shrinks and thus occupies a lesser volume. By the known methods where it is used sections of casing which are connected to each other by welding, the electrode paste will not have a sufficient downward flow to compensate for the shrinkage as the electrode paste will stick to the inner surface of the casing. There is thus a possibility that the baked carbon body will contain cavities, which will increase the possibility of electrode breakage when the carbon body is used as an electrode. Further, upon shrinkage of electrode paste which sticks to the inner surface of the casing, the casing may be locally deformed. This will be further enhanced as the casing during the further heating in the baking furnace will expand in axial direction whereby tensile stress can be introduced in the electrode paste.

From Swedish patent No. 112236 it is in connection with conventional self-baking electrodes for steel furnaces, known a method for the use of sections of casing which are filled with unbaked carbonaceous electrode paste. According to the Swedish patent each section of casing is filled with electrode paste prior to mounting the sections on the top of the electrode column. The lower part of each section of casing has a somewhat smaller diameter than the remaining part of the casing. When a new section of casing is mounted on the top of the electrode column, the lower part of the new section is installed in a telescopic way in the section of casing situated below the new section. In order to join the new section of casing to the electrode column, the area between the lower part of the new section of casing and the upper part of the electrode column is heated whereby the electrode paste in this area melts or softens whereby the electrode paste in the lower part of the new section of casing flows together with the electrode paste at the top of the electrode column. Thereafter the new section of casing is welded to the casing below. The baking of the electrode takes place in the area of electric power supply to the electrodes in the same way as for conventional self-baking electrodes.

The method disclosed in Swedish patent No. 112236 for joining sections of curings filled with electrode paste does, however, not solve the problems described above in connection with the electrode produced according to Norwegian patent No. 154860. Thus the use of the method for joining sections of casing according to the Swedish patent in connection with the method disclosed in Norwegian patent No. 154860, will not solve the problem of shrinkage of the electrode paste during the baking or the problem caused by expansion of the casing when the casing is heated in the baking furnace. Further, by using the method disclosed in the Swedish patent it will still be necessary to cut the casing horizontally in order to remove the casing below the baking furnace as it is a perequisite according to the Swedish patent that new sections of casing are welded to the casing below the new casing.

DISCLOSURE OF INVENTION

It is an object of the present invention to provide a method where it by the use of the method according to Norwegian patent No. 154860 is not necessary to weld new sections of casing to the casing below the new section of casing and where it is obtained an automatic compensation for shrinkage of the electrode paste and for extension of the casing during baking.

Accordingly, the present invention relates to a method for continuous production of elongated carbon bodies, particularly carbon electrodes which are produced in direct connection with the smelting furnace wherein the electrodes are consumed, where a metallic casing containing unbaked carbonaceous electrode paste comprising a particulate solid carbon material and a carbonaceous binder is continuously or substantially continuously lowered through a baking furnace which is heated to a temperature between 500 and 1200° C., whereby the unbaked electrode paste is baked into a solid carbon body and where the casing is extended by joining new sections of casing on the top of the casing as the casing is lowered through the baking furnace, where the lower part of each section of casing has an outer diameter that is equal to or smaller than the inner diameter of the upper part of each section of casing, said method being characterized in that each new section of casing is mounted upon the section of casing below in such a way that the lower part of the new section of casing is positioned inside the casing of the upper part of the section of casing situated below the new section of casing and where the length of the lower part of each section of casing has such an extension that the new section of casing during baking freely can slide downwards in relation to the section of casing situated below the new section of casing a distance which at least compensate for the shrinkage of the electrode paste contained in the casing during baking of the carbon body in the baking furnace.

According to a preferred embodiment it is used sections of casing consisting of an upper cylindrical part and a lower cylindrical part where the outer diameter of the lower cylindrical part is equal to or smaller than the inner diameter of the upper cylindrical part.

It is preferred that the ratio between the length of the upper part and the lower part of the section of casing is between 1:1 to 1000:1 and more particularly between 3:1 and 12:1.

According to another embodiment it is used sections of casing where at least the lower part of each section of casing has a conical shape such that the outer diameter of the conical part of the section of casing is smaller than the diameter of the top of the casing.

By the method of the present invention each section of casing is thus not rigidly affixed to the section of casing below, but is only loosily placed on the top of the section of casing situated below. As the electrode paste in the section below the upper section shrinks during the baking, the weight of the upper section of casing will cause the section of casing to freely slide down into the casing in the section of casing situated below. Shrinkage of the electrode paste will thus not cause local deformation of the casing.

By the method of the present invention the removal of sections of casing after baking of the electrode in the baking furnace is substantially simplified as one only has to cut the casing vertically.

According to another embodiment of the present invention each section of casing is filled with unbaked electrode paste to such a level that the distance from the level of electrode paste to the top of each section of casing is less than the length of the lower part of the sections of casing. The sections of casing can be filled with unbaked electrode paste prior to or after the sections are installed. In this way the lower part of the sections of casing will, when mounted, rest upon the unbaked electrode paste in the section of casing situated below.

SHORT DESCRIPTION OF THE DRAWINGS

Figure 2:
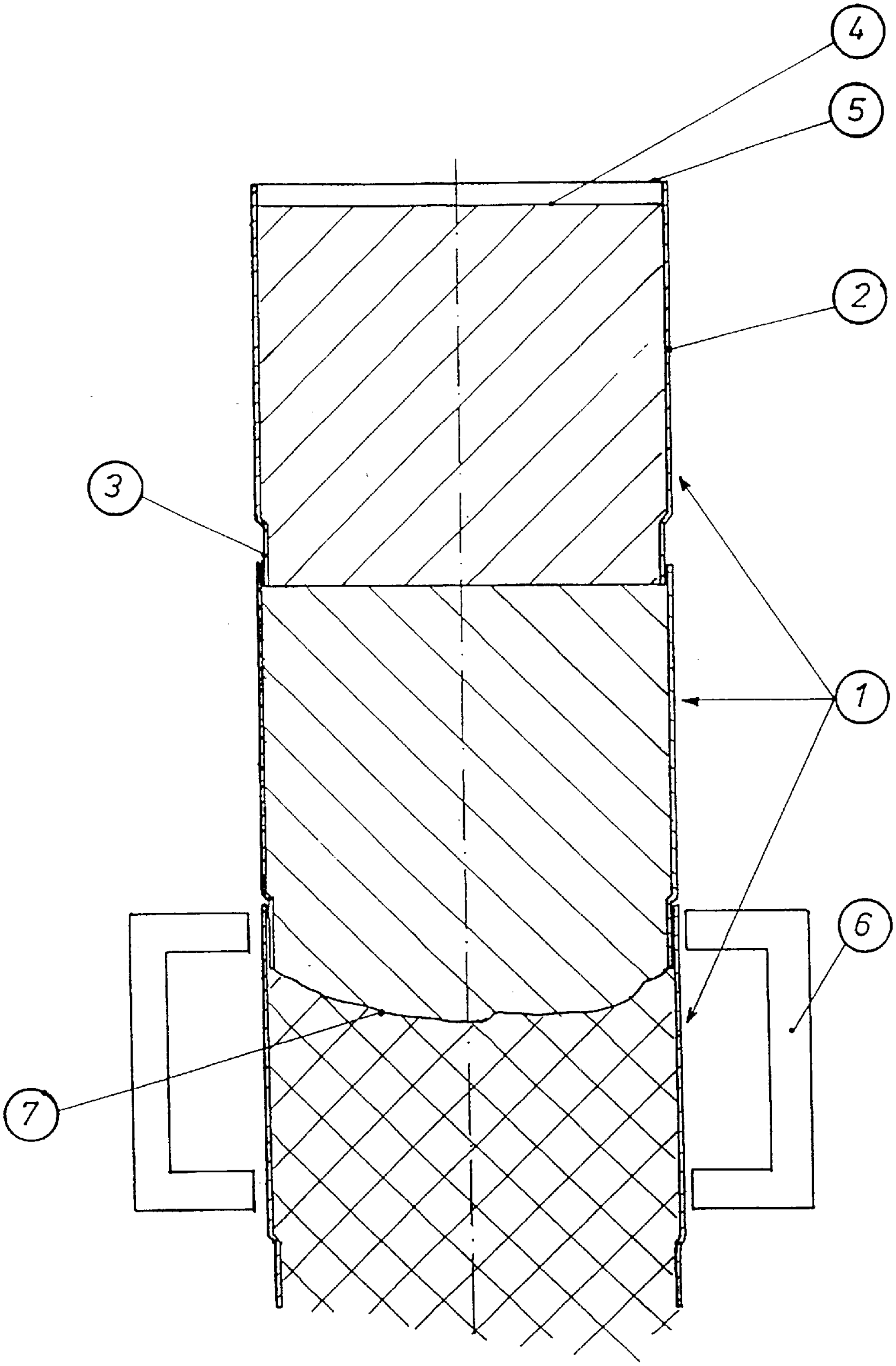
Figure 3:
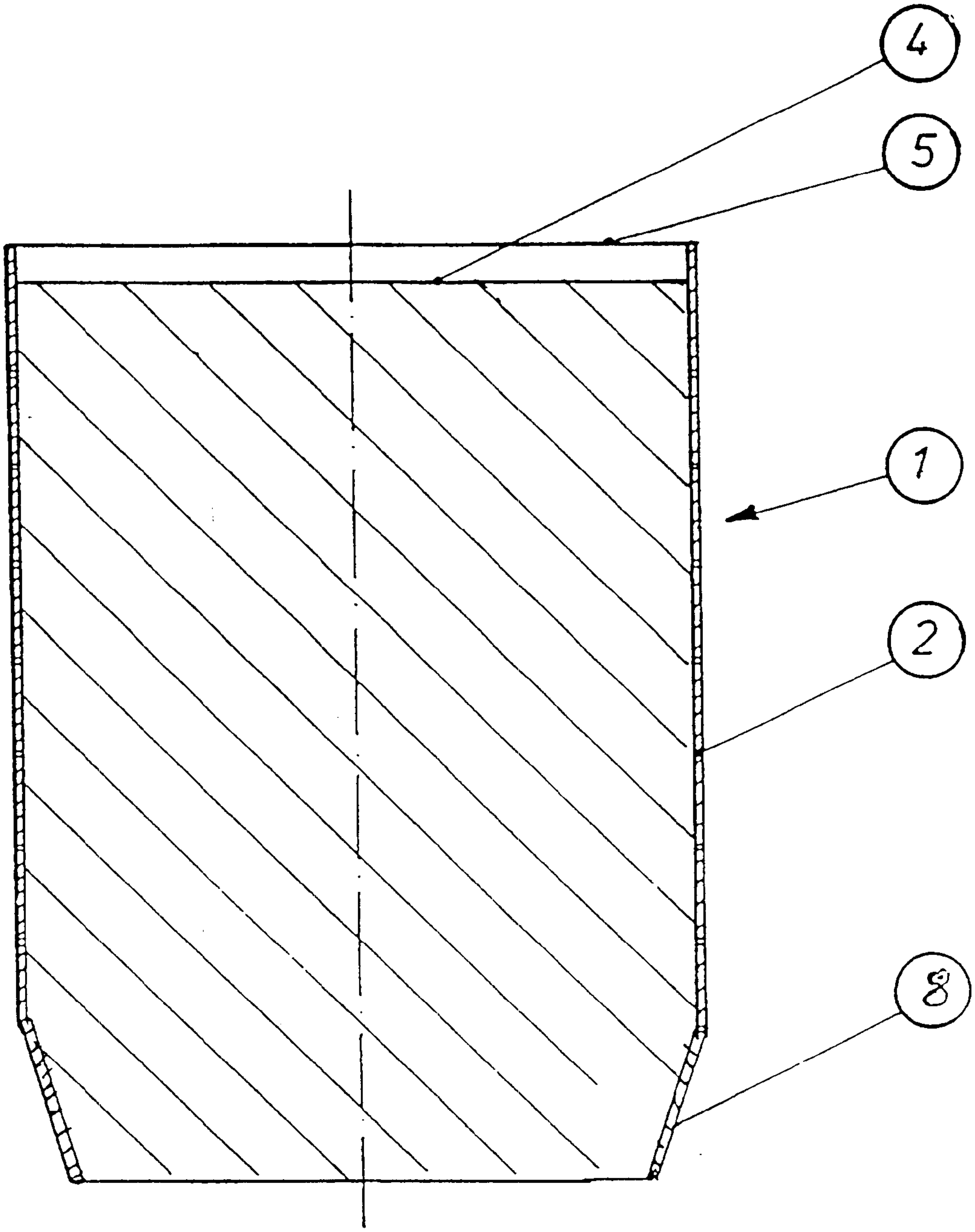

FIG. 1 shows a vertical cut through a section of casing for use in the method of the present invention, FIG. 2 shows a vertical cut through an electrode column extending through a baking furnace with the upper section of casing just being mounted, and where, FIG. 3 shows a vertical cut through a second embodiment of a section of casing for use in connection with the method of the present invention.

DETAILED DISCLOSURE OF INVENTION

On FIG. 1 there is shown a section of casing 1 consisting of an upper part 2 and a lower part 3. The lower part 3 of the section of casing has a slightly smaller diameter than the upper part 2 of the section of casing. The outer diameter of the lower part 3 is equal to or slightly smaller than the inner diameter of the upper part 2. When installing a new section of casing 1 a section of casing having the shape as shown in FIG. 1 is placed telescopically into the section situated below. The section of casing 1 is preferably filled with unbaked electrode paste to a level shown by reference numeral 4 on FIG. 1, such that the distance from the level 4 to the top 5 of the section of casing is less than the length of the lower part 3 of the section of casing. Alternatively the section of casing is filled with unbaked electrode paste to the level 4 after the section of casing has been placed in telescopic connection with the section of casing situated below.

On FIG. 2 there is schematically shown a baking furnace 6 which can be heated by means of a suitable heating means such as electric resistance heating, induction heating, gas burners, oil burners etc. An electrode casing consisting of a number of a telescopically arranged section of casing 1 having a shape as shown in FIG. 1 and which contains unbaked electrode paste, is continuously or substantially continuously lowered through the baking furnace 6. In the baking furnace the unbaked electrode paste is baked into a solid carbon body by maintaining a temperature between 500 and 1300° C. in the baking furnace.

The border between the unbaked electrode paste and the baked carbon body is shown by reference numeral 7 in FIG. 2.

When mounting a new section of casing, the new section is placed with the lower part 3 of the casing inside the casing below. The lower edge of the new section of casing will thereby rest upon the electrode paste in the section of casing situtated below. As the sections of casings containing unbaked electrode paste are being lowered through the baking furnace, the electrode paste will be heated and starts to soften and during baking the electrode paste will shrink. Due to the weight of the sections of casing filled with electrode paste situated above the baking furnace, the soft electrode paste inside the baking furnace will be pressed together and the section of casing will slide downwardly relative to the casing below. When the joint between two sections of casing has entered into the baking furnace, the telescopical connection between the section of casing will be sealed.

By the method of the present invention the sections of casing are not joined to each other by welding or by means of any other kind of rigid connections, but rest freely on the electrode paste in the section of casing below.

Since the individual sections of casing filled with electrode paste rest on the electrode paste in the section of casing below, unbaked electrode paste will always be under pressure whereby any cavity will be filled with electrode paste when the paste softens, and the reduction in volume of the electrode paste will automatically be compensated as the sections of casing are free to move relatively to each other. Further, elongation of the casing due to heat will not be transferred to the other section of casing as this elongation is compensated by the telescopical connection. Elongation of a section of casing will thereby not transfer any forces to the sections of casing above or below a certain section of casing.

As it is possible to fill the sections of casing with unbaked electrode paste prior to mounting the sections of casing, gases which evolve in the electrode paste during baking in the baking furnace can not escape through the top of the electrode column as the top of the electrode column always will contain cold electrode paste.

Even if the method of the invention has been described for the embodiment where the lower part of the section of casing has a smaller diameter than the top of the casing, it is within the scope of the present invention to mount the sections of casing with the upper part down. In this case one will have a telescopic connection between sections of casing where the part of the section of casing having the biggest diameter is mounted in such a way that the biggest diameter is placed outside the casing below.

On FIG. 3 there is shown another embodiment of a section of casing which can be used in connection with the method of the present invention. Parts on FIG. 3 which correspond to parts on FIG. 1 have identical reference numerals. The section of casing shown in FIG. 3 has an upper cylindrical part 2 and a lower conical part 8 where the outer diameter of the lower conical part 8 is smaller than the inner diameter of the upper cylindrical part 2. When mounting a new section of casing, the section of casing is placed in such a way that the conical lower part 8 fits into the section of casing below.

The casing used in the present invention may be perforated in order to allow gases which evolve during baking to flow into the baking furnace.

As the sections of casing according to the method of the present invention are not rigidly affixed to each other by welding or the like, it is easy to remove the casing after the electrode has been baked. It is only necessary to cut the casing vertically.

The method according to the present invention gives a substantial simplification of the work needed for mounting new sections of casing at the same time as the environment for the operators is substantially improved. Further it is obtained an improved quality of the produced carbon bodies, as the possibility for cavities in the baked carbon bodies is effectively eliminated.

What is claimed is:

1. Method for continuous production of carbon electrodes which are produced in direct connection with a smelting furnace wherein the electrodes are consumed, where a metallic casing containing unbaked carbonaceous electrode paste comprising a particulate solid carbon material and a carbonaceous binder is continuously or substantially continuously lowered through a baking furnace which is heated to a temperature between 500 and 1200°, whereby said unbaked electrode paste is baked into a solid carbon body and where the casing is extended by joining new sections of casing on the top of the casing as the casing is lowered through the baking furnace, where the lower part of each section of casing has an outer diameter that is equal to or smaller than an inner diameter of the upper part of each section of casing, characterized in that each new section of casing is mounted upon the section of casing below in such a way that the lower part of the new section of casing is positioned inside the casing of the upper part of the section of casing situated below the new section of casing and where the length of the lower part of each section of casing has such an extension that section of casing during baking freely can slide downwards in relation to the section of casing situated below the new section of casing a distance which at least compensates for the shrinkage of the electrode paste contained in the casing during baking of the carbon body in the baking furnace.

2. Method according to claim 1 characterized in that each section of casing before mounting is filled with said unbaked electrode paste to such a level that the distance from the level of said electrode paste to the top of each section of casing is less than the length of the lower part of the sections of casing, whereby the lower part of the sections of casing will, when mounted, rest upon said unbaked electrode paste in the section of casing situated below.

3. Method according to claim 1, characterized in that each section of casing after mounting is filled with said unbaked electrode paste to such a level that the distance from the level of said electrode paste to the top of each section of casing is less than the length of the lower part of the sections of casing, whereby the lower part of the sections of casing will, when mounted, rest upon said unbaked electrode paste in the section of casing situated below.

4. Method according to claim 1, characterized in that each section of casing consists of an upper cylindrical part and a lower cylindrical part where the outer diameter of the lower cylindrical part is equal to or smaller than the inner diameter of the upper cylindrical part.

5. Method according to claim 1, characterized in that at least the lower part of each section of casing has a conical shape such that the outer diameter of the conical part of the section of casing is smaller than the diameter of the top of the casing.

6. Method according to claim 1, characterized in that the ratio between the length of the upper part and the lower part of the section of casing is between 1:1 to 1000:1.

7. Method according to claim 6, characterized in that the ratio between the length of the upper part and the inner part of the section of casing is between 3:1 and 12:1.

* * * * *